Oct. 22, 1968

L. HENRY 3,406,776

ACOUSTIC METHOD AND APPARATUS FOR EXAMINING FORMATIONS
ADJACENT THE WALLS OF BOREHOLES

Filed March 23, 1965

INVENTOR.
LOUIS HENRY

BY his ATTORNEYS

FIG. 4

INVENTOR.
LOUIS HENRY

INVENTOR.
LOUIS HENRY

United States Patent Office 3,406,776
Patented Oct. 22, 1968

3,406,776
ACOUSTIC METHOD AND APPARATUS FOR EXAMINING FORMATIONS ADJACENT THE WALLS OF BOREHOLES
Louis Henry, Chevilly-Larue, France, assignor to Societe de Prospection Electrique Schlumberger S.A., Paris, France, a corporation of France
Filed Mar. 23, 1965, Ser. No. 442,041
Claims priority, application France, Apr. 2, 1964, 969,576
20 Claims. (Cl. 181—.5)

This invention relates to a method and apparatus for examining formations adjacent the walls of boreholes and, more particularly, to an ultrasonic method and apparatus for detecting fractures in formations through which the boreholes extend.

It is well known that oil-bearing formations such as limestone can not produce oil unless they have fractured surfaces. It is therefore of considerable importance to determine the presence or absence of natural fractures in such oil-carrying formations so as to ascertain whether the hydrocarbons contained in these formations may be recovered.

The methods used hitherto for detecting the presence of fractures in hard ground resort generally to acoustic means. It is a well-known fact that an acoustic wave traveling inside a rock having fractures is subjected to a particularly significant attenuation because of the presence of such fractures. Generally speaking, the amplitude of the acoustic energy of a predetermined wavelength received by a receiver is proportional to the number, width and angular disposition of the fractures appearing in a solid medium separating the transmitter from the receiver. Various arrangements for detecting fractures in layers of hard material surrounding a borehole have been used in accordance with this principle. Experimental calculators have been constructed with the aid of which it is possible to determine approximately from the amplitude of the received signal for the different wavelengths used the total width of the fractures extending across the acoustic path which has been examined.

These prior art arrangements are, however, subject to a particularly objectional limitation in that only fractures of a comparatively large width can be detected. This limitation is ascribable chiefly to the nature of the main type of acoustic waves produced in the ground layers by the omnidirectional transmitters which are generally used in boreholes. These waves are compression waves, which are not very sensitive to fractures.

It is well known that another type of wave is propagated in the ground layers together with the compression waves, to wit shear waves. Since shear waves are only readily propagated in solid materials, a liquid sheet of very narrow width extending across the path of shear waves attenuates these waves to a considerable extent. This enables the detection of fractures by resorting to shear waves.

Heretofore, however, the prior art devices have not separated the compression waves from the shear waves as they are introduced into the ground layers. Rather, it has been endeavored to select among the electric signals produced in a receiver by the various acoustic waves received the signal which is produced by the shear waves. To this end, use has been made of the fact that the speed of propagation of shear waves in hard rocky material which may show fractures is equal to approximately 0.6 the speed of propagation of compression waves.

Thus, it has been proposed to separate the electric signals produced in a receiver by the compression waves and the shear waves by making the length of the path travelled by the waves between the transmitter and the receiver a predetermined value which shifts the phase between these waves by 90°. A phase and amplitude detector is then used to separate the two types of signals. Unfortunately, different ground materials substantially alter the speeds of propagation of both types of waves, so that it has not been possible to achieve satisfactory results with this technique.

In accordance with another prior art method, the signals produced by the acoustic receiver are displayed on the screen of a cathode ray tube. A series of pulses is emitted by the transmitter, and there can be observed a first signal corresponding to the compression waves, followed several microseconds by a second signal corresponding to the shear waves. In the absence of any fracture, it is found that the second signal has an amplitude which is substantially larger than that of the first signal. If there are fractures across the path of the acoustic waves, the first signal is attenuated by perhaps 10% whereas the second signal is subjected to an attenuation of about 80%. This method thus permits the observer to measure the attenuation of the shear waves and thereby obtain an indication of the number and width of fractures extending across the path between the transmitter and the receiver. It is apparent that this technique is time-consuming and costly, and has limited application for industrial use in the field.

Accordingly, it is an object of the present invention to overcome the above-mentioned difficulties of conventional systems for detecting fractures in formations through which boreholes extend.

Another object of the invention is to provide a novel method and apparatus for detecting fractures from electric signals produced by shear waves transmitted through ground layers adjacent boreholes.

A further object of the invention is to provide improved fracture detecting apparatus which is sensitive to the finest commercially interesting fractures and which is capable of precisely locating each fracture.

These and other objects and advantages of the invention are attained by transmitting a narrow ultrasonic wave beam from a liquid-filled borehole through the borehole wall at such an angle of incidence thereto that the transmission of compression waves into the ground layers is minimized while a maximum amount of shear waves is produced in these layers. The shear waves are refracted in the formation and propagated therein generally along the borehole wall. After a travel of a predetermined length in the ground layers, the ultrasonic wave is received by an electro-acoustical transducer located in the liquid-filled borehole, the electric signal output of the transducer being especially responsive to fractures extending across the path of the shear waves due to the above-mentioned properties of this type of wave.

The features and advantages of the invention are more fully explained in the detailed description of a preferred form of the invention which follows, reference being made to the accompanying drawings wherein.

Figure 1:
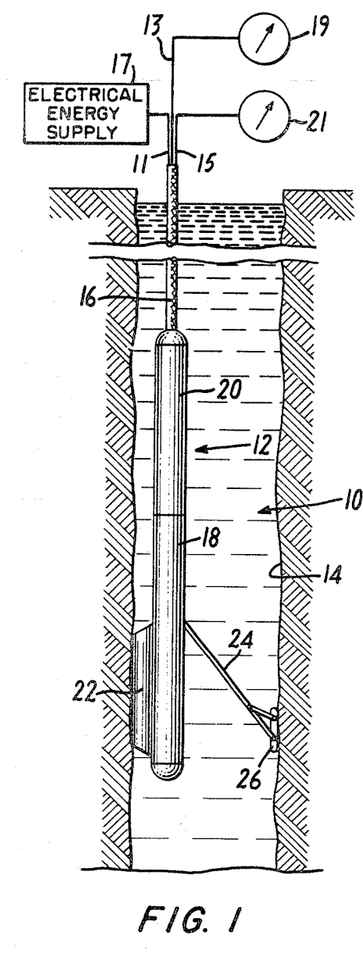
FIG. 1 is an elevational view of a typical apparatus for detecting fractures embodying the present invention, including a sounding rod disposed inside a borehole.

In the embodiment of the invention shown by way of example in FIG. 1, 10 designates a borehole filled with liquid, usually conventional drilling mud, in which a sounding rod 12 has been sunk for detecting the fractures appearing along the walls 14 of the borehole 10. The probe 12 is suspended from the ground level by an electric cable 16. The sounding rod 12 includes a first section 18 carrying the measuring shoe 22 and a carrier arm 24 to which is secured an auxiliary shoe 26. The carrier arm 24 extends out from the section 18 so as to urge the measuring shoe 22 and the auxiliary shoe 26 against generally opposite portions of the borehole wall 14, so that the measuring shoe is retained in close proximity with the borehole wall. The carrier arm 24 may be biased outwardly from the section 18 by a suitable spring mechanism (not shown), for example. The sounding rod 12 also includes a second section 20 enclosing the electronic circuits illustrated in FIGS. 4 and 5. Section 20 is electrically connected through the lines 11, 13 and 15 with a supply of electrical energy 17 and with a pair of measuring instruments 19 and 21, respectively. It is to be understood that a suitable hoist (not shown) at the ground level raises or lowers the sounding rod 12 as desired.

Figure 2:
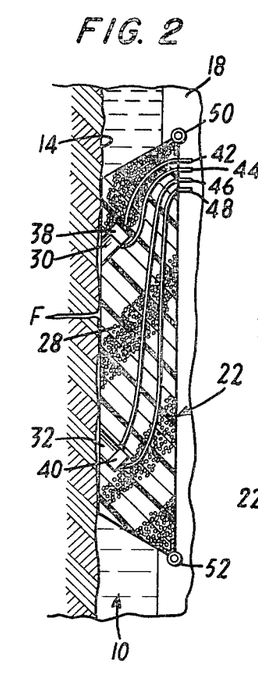
FIG. 2 is an enlarged sectional view of the measuring shoe on the sounding rod of FIG. 1.
Figure 3:
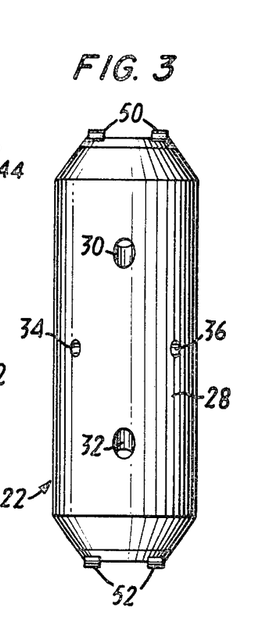
FIG. 3 is a front elevational view of the measuring shoe of FIG. 2.

FIG. 2 illustrates the measuring shoe 22 disposed against the wall 14, whereby a fracture F may be detected. The shoe 22 includes a block 28 of a heterogeneous material including lead balls of a small diameter embedded in the resin sold under the trade name Araldite, for example. Inside the block 28 are formed four cylindrical housings 30, 32, 34 and 36 (see FIG. 3) which are arranged in a vertical pair 30, 32 and a horizontal pair 34, 36. The housings 30 and 32 are formed in the block 28 in such a manner that their axes are symmetrically disposed to the outer surface of the shoe 22 at angles of about 35° with reference to a medial horizontal plane through the block (see FIG. 2). The housings 34 and 36 are located in a common horizontal plane and symmetrically about a vertical plane. The housings 30 and 32 are provided with electroacoustical transducers 38 and 40, respectively, which include a piezoelectric element of barium titanate, for example. The transducers 38 and 40 are connected respectively to leads 42, 44 and 46, 48, the leads 44 and 46 being returned to a reference potential such as ground. The housings 34 and 36 are similarly provided with electroacoustical transducers and connecting leads (not shown). The measuring shoe 22 is mounted on the section 18 with coupling hinges 50 and 52.

Figure 4:
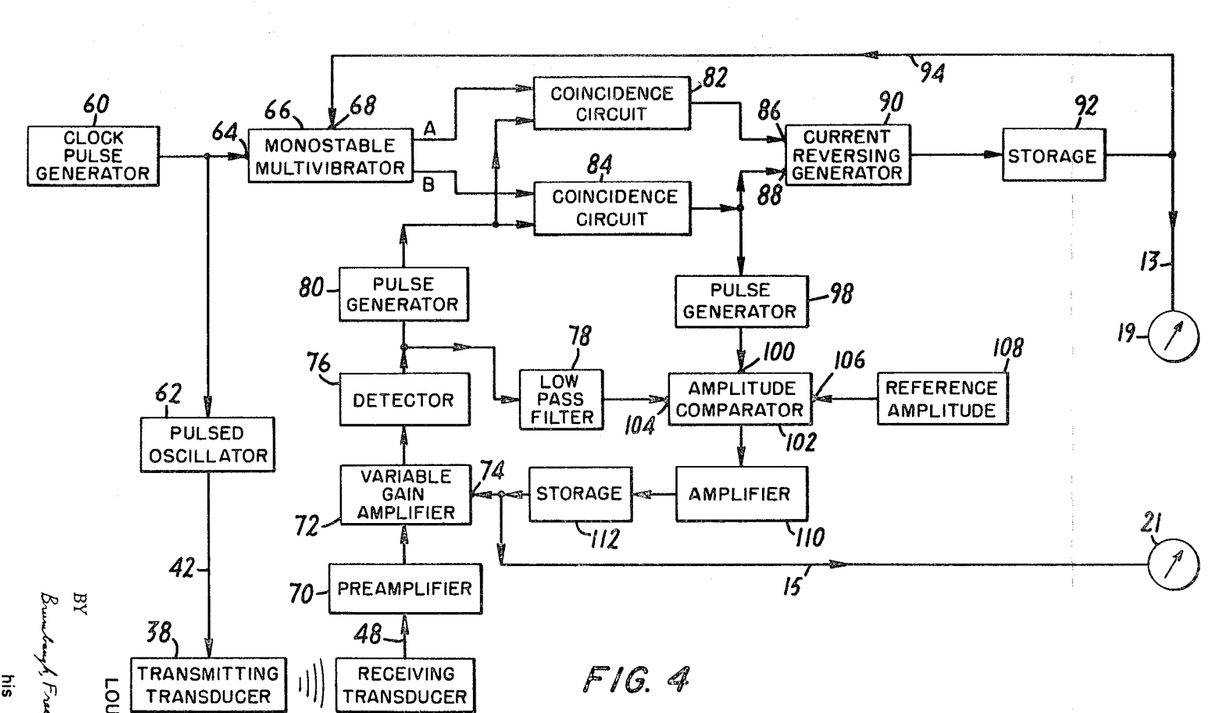
FIG. 4 is a block diagram of electrical circuitry included in the apparatus of FIG. 1.

FIG. 4 shows the electrical circuitry associated with the transducers 38 and 40. A time base generator 60 supplies short pulses having a pulse repetition rate or "clock" frequency of 500 cycles per second. The output of the generator 60 is applied to the control electrode of a power oscillator 62 which supplies a signal of about 300 kilocycles per second during a period of about 25 microseconds, for example. The output of the pulsed oscillator 62 is applied to the transmitting transducer 38 through the conductor 42. In addition, the output of the generator 60 is applied to the trigger electrode 64 of a conventional monostable multivibrator 66, the duration of the output pulse of which may be controlled linearly by a voltage impressed on a time-controlling electrode 68. The output of the receiving transducer 40 is connected through the line 48 to the input of a preamplifier 70, the output of which feeds the input of a variable gain amplifier 72 provided with a gain-controlling electrode 74, the gain control having an approximately logarithmic action. The output of the amplifier 72 feeds a detecting stage 76 which in turn feeds the input of a low pass filter 78 and of a pulse generating stage 80. The output of the pulse generator 80 is applied to one of the inputs of two coincidence or AND circuits 82 and 84, the other of the inputs being fed with the complementary output signals A and B respectively from the monostable multivibrator 66. Each coincidence circuit has an output only when both inputs thereof are energized. The outputs of the AND circuits 82 and 84 are connected to the inputs 86 and 88, respectively, of a current reversing generator 90 which produces currents of a predetermined amplitude, the sign of which is minus for a control signal applied at input 86 and plus for a control signal applied at input 88. The output of the generator 90 feeds a memory or storage device 92, such as a capacitor, which is connected through the line 94 to the time-controlling electrode 68 of the monostable multivibrator 66. The capacitor 92 is also connected through the line 13 to the input of the measuring instrument 19, which may be a suitable galvanometer, for example. The time constant of the capacitor 92 and the associated equivalent resistance is equal to several hundred periods of the clock signal produced by the time base generator 60.

The output of the AND circuit 84 is also connected to a pulse generator 98 which applies a gating or reading pulse to the electrode 100 controlling the operation of an amplitude comparator 102. The two inputs 104 and 106 of the comparator 102 are connected respectively to the low pass filter 78 and to a reference amplitude supply 108. The output of the amplitude comparator 102 feeds the input of a linear amplifier 110 whose output is connected to a memory capacitor 112 which is connected in turn to the gain-controlling electrode 74 of the variable gain amplifier 72. The output of the memory capacitor 112 is also connected through the line 15 to the input of the measuring instrument 21. The time constant of the memory capacitor 112 and the associated equivalent resistance is equal to only about 20–30 periods of the clock signal produced by the generator 60.

Figure 5:
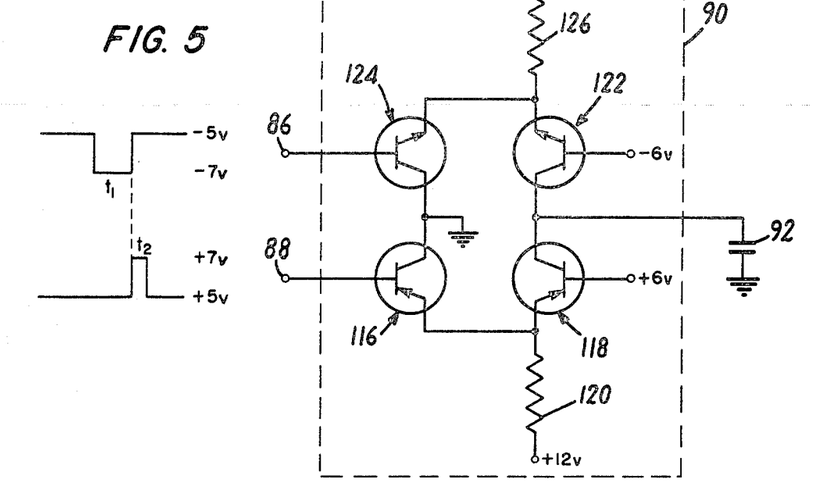
FIG. 5 is a schematic illustration of an electrical circuit included in the block diagram of FIG. 4.

FIG. 5 shows the electrical circuitry of a representative embodiment of the current reversing generator 90, including waveforms of typical input signals to the inputs 86 and 88. The input 88 is connected to the base of a transistor 116, the emitter of which is joined to the emitter of a transistor 118 and is connected through a resistor 120 to a source (not shown) of positive D.C. voltage, for example 12 volts. The transistors 116 and 118 are of the p-n-p type. The collector of the transistor 116 is grounded, and the collector of the transistor 118 is joined to the collector of a transistor 122 and is connected to one terminal of the capacitor 92, the other terminal being grounded. The base of the transistor 118 is connected to a source (not shown) of positive D.C. voltage, for example 6 volts, and the base of the transistor 122 is connected to a source (not shown) of negative D.C. voltage, for example 6 volts. The emitter of the transistor 122 is joined to the emitter of a transistor 124 and is connected through a resistor 126 to a source (not shown) of negative D.C. voltage, for example 12 volts. The input 86 is connected to the base of the transistor 124, and the collector thereof is grounded. The transistors 122 and 124 are of the n-p-n type.

When the voltage on the input 88 is +5 volts, the transistor 116 is conductive or "on" and the transistor 118 is cut off, because of the +6 volt bias on its base. When the voltage on input 88 is +7 volts, however, the transistor 116 is cut off and the transistor 118 is conductive. In this latter case, the capacitor 92 is charged by a current whose magnitude is determined by the value of the resistor 120 and the equivalent resistance of the transistor 118. This charging current flows during the time $t_2$ when the transistor 118 is conductive, i.e., as long as the signal on the input 88 is +7 volts. Similarly, when the voltage on the input 86 is −5 volts, the transistor 124 is conductive and the transistor 12 is cut off. When the input voltage is −7 volts, however, the transistor 124 is cut off and the transistor 122 is conductive, during which condition the capacitor is discharged by a current which flows during the time $t_1$ that the signal on the input 86 is −7 volts. The transistors 118 and 122 are selected to have the same characteristics, and the resistors 120 and 126 have the same resistance value, so that the charging current into the capacitor 92 equals the discharge current therefrom. If these currents are represented by I and the capacitor 92 has a capacitance C, then the voltage V across the capacitor 92 as a result of the two pulses illustrated being applied to the inputs 86 and 88 may be expressed by the relationship $$V=(t_2-t_1)I/C$$

When the transducer 38 produces an acoustic compression wave in the mud within the borehole 10, the wave forms an ultrasonic beam having a half opening angle which is determined by the ratio between the wavelength of the beam and the diameter of the transducer. Since the speed of propagation of the acoustic waves in the mud is equal to about 1500 meters per second, the half opening angle of an acoustic beam of a frequency of 300 kilocycles per second produced by a transducer 38 having a diameter of 3 centimeters is substantially equal to 10°. The axis of the housing 30 inside the measuring shoe 22 being at an angle of about 35° with reference to the surface of the shoe, the various angles of incidence of the waves produced by the transducer 38 with the borehole wall 14 range between 25° and 45°.

It is well known that the speed of propagation of compression waves in hard rocks likely to contain fractures is generally equal to 5000 meters per second ±20%, whereas the speed of propagation of shear waves in the same rocky layers is equal to 3000 meters per second ±20%. Under such conditions, the angle of incidence of an ultrasonic beam producing a total reflection of the compression waves from the wall of the borehole ranges between 15° and 20°, while the angle of incidence of a beam producing in the layers shear waves which are refracted in parallelism with the borehole wall ranges between 25° and 45°.

Because of the average angle of incidence of 35° and the half opening angle of 10°, the ultrasonic beam produced by the transducer 38 should theoretically produce only shear waves in the ground layers. In practice, however, various factors prevent the perfect total reflection of the compression waves which might be expected. Among such factors are the unevenness of the borehole wall and the modifications in the angle of incidence ascribable to variations in the diameter of the borehole. Experience shows, however, that the amplitude of the compression waves produced by the transducer 38 in the ground layers is at most equal to a few percent of the amplitude of the shear waves.

The transducer 38 being secured inside the block 28 of heterogeneous material such as small lead balls embedded in the resin sold under the trade name Araldite, the waves emitted by the transducer in directions other than through the opening of the housing 30 are rapidly absorbed, as are the compression waves reflected by the wall 14 of the borehole. It is thus possible to consider that the only waves which reach the transducer 40 carried inside the housing 32 are those produced by the shear waves which are propagated inside the ground layers. These shear waves during their travel through the ground layers adjacent the borehole wall send waves into the borehole at the same angle of incidence, nominally 35°, at which the waves are transmitted by the transducer 38 into the formation. The waves returned from the formation into the borehole are transformed into compression waves in the borehole liquid. Because of the slope of 35° of the axis of the recess 32 with reference to the wall 14, a maximum signal from the shear waves in the formation is received by the transducer 40.

The length of the path followed by the sheer waves in the ground layers is about 10 centimeters. Inasmuch as this path corresponds to about ten wavelengths and the logarithmic decrement of the acoustic energy in the type of ground considered is of a magnitude of about 0.5, there is an attenuation of the acoustic waves in the absence of any fractures by a factor of about 150. The electrical signal produced by the transducer 40 in response to the acoustic waves received thereby is amplified by a preamplifier 70 before it is applied to the variable gain amplifier 72. If a fracture F is in the path of the acoustic wave received by the transducer 40, the amplitude of this wave is considerably reduced. An object of the fracture detector according to the invention is to record such attenuations. If the signal across the terminals of the transducer 40 is equal to zero or is very small, it is possible to conclude that one or more large fractures lie in the path between the transducers 38 and 40. Since this can occur only in hard rocks, it is essential to determine the hardness of the ground layers so that there is no possible doubt as to the quality of the information supplied by the apparatus.

Figure 6:
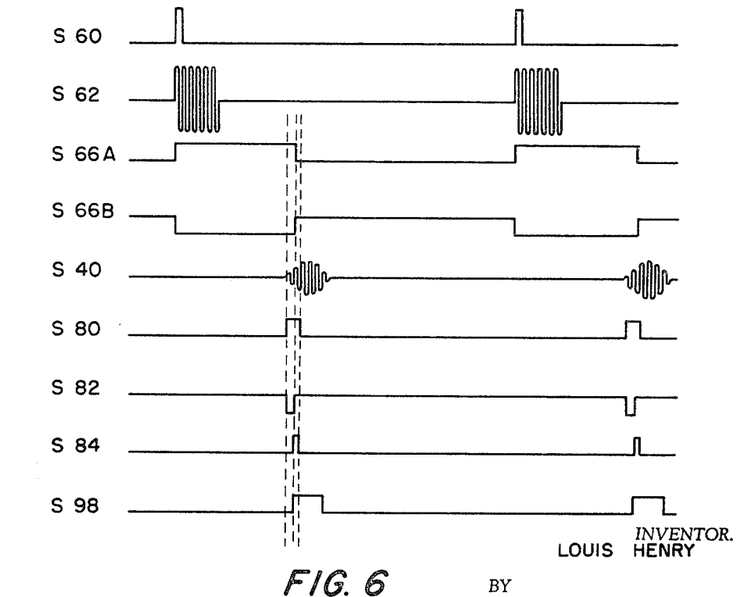
FIG. 6 is a diagram of waveforms at various points of the block diagram of FIG. 4.

The operation of the apparatus will now be described in conjunction with the electrical circuitry of FIG. 4 and the waveforms of FIG. 6. The upper portion of the block diagram of FIG. 4 is an arrangement for measuring at any moment the speed of propagation of the shear waves in the ground layer under investigation. To this end, the monstable multivibrator 66 is triggered by the pulse S60 produced by the time base generator 60. The multivibrator 66 transmits the usual complementary signals S66A and S66B to one of the inputs of the coincidence circuits 82 and 84, respectively. The durations of the pulses S66A and S66B is linearly controlled in accordance with the amplitude of the voltage applied to the control electrode 68. The signal S40 produced by the receiving transducer 40 in response to the output signal S62 of the pulsed oscillator 62 is amplified by the amplifiers 70 and 72 and detected in the detecting stage 76. The detector 76 drives a pulse generator 80 which produces a pulse S80 of about 5 microseconds duration which is applied to the other of the inputs of the coincidence circuits 82 and 84. At the output of the coincidence circuits two pulse signals S82 and S84 are formed, the pulses S82 being negative and occurring during the period when the (positive) pulses S66A and S80 coincide, and the pulses S84 being positive and occurrring during the period when the (positive) pulses S66B and S80 coincide. Such coincidence circuits are well known in the art and need not be explained in detail. The front edge of the pulse S84 is synchronous with the rear edge of the pulse S82 and the sum of the durations of the two pulses is equal to the duration of the pulse S80.

The presence of a pulse S82 at the input 86 of the current reversing generator 90 causes a discharge current to flow out of the memory capacitor 92 throughout the duration of the pulse, as discussed above. Similarly, the presence of a pulse S84 at the input 88 of the generator 90 causes a charging current to flow into the capacitor 92. At the end of each pulse S80, the voltage across the capacitor 92 has been modified in accordance with the difference in duration between the pulses S82 and S84. This difference in duration represents the degree to which the midpoint in time of the pulse S80 leads or lags the rear edge of the pulse S66A, inasmuch as the pulses S82 and S84 are generated by comparing the time of occurrence of the pulse S80 with that of the pulse S66A (and is complement S66B) by means of the coincidence circuits 82 and 84. Since the memory capacitor 92 is connected by the line 94 to the duration-controlling electrode 68 of the multivibrator 66, there is a negative feedback loop which from one clock cycle to the next adjusts the position of the rear edge of the pulse S66A to register with the midpoint in time of the pulse S80. As explained above, the pulse S66A is initiated by the pulse S60 from the time base generator 60, which also drives the transmiting transducer 38 through the pulsed oscillator 62. The duration of the pulse S66A is thus equal to the transmission time of the acoustic waves between the transmitting transducer 38 and the receiving transducer 40. Since the multivibrator 66 is provided with a linear pulse duration control, the voltage across the memory capacitor 92 measured by the galvanometer 19 indicates the transmission time of the acoustic waves between the transducers 38 and 40, inasmuch as the duration of the pulse S66A is a linear function of the voltage across the capacitor 92. As discussed above, the arrangement of the transducers 38 and 40 in the measuring shoe 22 is such that the waves which reach the transducer 40 may be considered to be produced by the shear waves which are propagated inside the ground layers. Thus the galvanometer 19 indicates the speed of propagation of the shear waves in the ground layer under investigation.

The lower portion of the block diagram illustrated in FIG. 4 is an arrangement for measuring the attenuation to which the shear waves are subjected during their travel in the ground layers. The electric signal produced by the transducer 40 is amplified in the stages 70 and 72, detected at 76 and filtered by the low pass filter 78. An envelope waveform of substantial amplitude and having a duration of about 25 microseconds (the duration of the output pulses of the pulsed oscillator 62) appears at the output of the filter 78. The variable gain amplifier 72, detector 76, filter 78, amplitude comparator 102, amplifier 110 and memory capacitor 112 comprise a negative feedback loop which adjusts the gain of the amplifier 72 so that the average amplitude of the envelope signal applied to the input 104 of the amplitude comparator 102 may be kept at a predetermined reference value defined by the supply 108.

In the absence of an envelope signal at 104, the amplitude comparator 102 produces no output signal. The reading signal S98 produced by the generator 98 which enables operation of the comparator 102 is a pulse of 10 microsecond duration, the front edge of which coincides in time with the front edge of the pulse S84. The output of the comparator 102 thus produces an error signal equal to the difference between the average amplitude of the envelope signal during the duration of the reading pulse S98 and the amplitude of the reference supply 108. This error signal is amplified at 110 and memorized by the capacitor 112. Since the voltage controlling the gain of the amplifier 72 has a substantially logarithmic effect, the negative feedback loop described above adjusts the amplitude of the voltage appearing at 74 to a value equal to logarithm of the attenuation produced by the fractures lying in the path between the transmitter 38 and the receiver 40.

Under the action of the voltage applied at 74 the gain of the amplifier 72 may vary between 1 and 1000, for example. It might appear that under such conditions low amplitude signals produced in the receiver 40 by compression waves appearing in the formation as a consequence of imperfect total reflection might produce a false operation of the apparatus. In practice, fractures in rocks cannot be considered as forming mere water sheets. Also, such fractures are often disposed obliquely of the acoustic path. Furthermore, there may be areas of grains of sand which affect the transmission of shear waves more than the transmission of compression waves. For these and other reasons, the different degree of attenuation of the shear waves and the compression waves is somewhat less than might be expected. Nevertheless, in practice a given fracture produces an attenuation which is at least three times greater for shear waves than for compression waves. Also, as mentioned above, the amplitude of the compression waves produced by the transducer 38 according to the present invention in the ground layers is only about 2% of the amplitude of the shear waves therein. Consequently, the amplitude of a parasitic signal which may be produced at the output of the detecting stage 76 by a compression wave received by the transducer 40 is always small compared to the amplitude of a signal produced by a shear wave. It is therefore easy to select by means of a conventional threshold circuit (not shown) the signals appearinng at the output of the detecting stage 76 so as to prevent any parasitic or extraneous signals produced by the reception of compression waves or otherwise from triggering the pulse generator 80. Inasmuch as the voltages measured by the galvanometers 19 and 21 are fed by supplies controlled by the output pulse S80 of the generator 80 and this pulse can be produced only in response to the reception of a shear wave, the indications of the galvanometers 19 and 21 relate at any moment to the duration of transmission and to the attenuation of shear waves.

It should also be remarked that the use of the memory capacitor 92 having a time constant of several hundred clock cycles allows the arrangement according to the invention to insure a suitable selection of the various signals collected by the receiving transducer 40. Also, the maintenance on the capacitor 92 of a voltage proportional to the time of transmission defines the moment at which the reading gate pulse S98 may appear. Under such conditions, an extraneous signal of relatively large amplitude occurring prior to a relatively small amplitude acoustic signal will not trigger the pulse generator 98 and thus produce a false reading on the attenuation measuring instrument 21. On the other hand, the voltage across the memory capacitor 112, the time constant of which is at most equal to about 20–30 clock cycles, adjusts relatively rapidly the gain of the amplifier 72 to restore the signal at the output of the low pass filter 78 to the reference value. The galvanometer 21 then records a sudden increase in voltage which defines with perfect certainty a fracture in the ground since the reading pulse S98 has operated at the precise moment at which the signal of low amplitude has been received.

In contradistinction, if there is no output signal from the detector 76 for any reason whatever, no pulse S80 or S98 can be generated and the circuit calculating the attenuation becomes an open loop. Under such conditions, the capacitor 112 is discharged. Nevertheless, the maintenance of the voltage across the capacitor 92 permits the reading pulse S98 to be generated as soon as a signal is received again.

According to my improved arrangement, the attenuation of the shear waves within a layer of a predetermined width may be recorded on a logarithmic scale. This provides an indication of the total width of the fractures met by the waves. The use of a logarithmic scale is particularly convenient because of the range of 1 to 1000 which is preferably selected for the amplifier 72. The simultaneous measurement of the transmission time provides a check of the attenuation information by ascertaining the degree of compactness or of hardness of the ground layers and consequently the probability of such layers showing fractures.

It is to be understood that conventional recording instruments may be employed in addition to the measuring instruments 19 and 21, the styli of the recorders being actuated by the voltages at the duration control electrode 68 and the gain control electrode 74, if pen and ink recorders are used for example. The recording paper is driven past the styli in accordance with the displacement of the probe 12 in the borehole so as to produce a plot of the attenuation and transmission time against the depth within the formation, whereby fractures are readily located.

The transducers 38 and 40 are arranged in a vertical plane. The measuring instrument 19 thus indicates the duration of the vertical travel of the shear waves and the instrument 21 measures the attenuation produced by the fractures occurring across this path. Experimental measurements have shown that the attenuation produced by a fracture of a predetermined width on shear waves is equal to 2, 8 or 12 decibels according to whether the fracture extends at 90°, 45° or 30° with reference to the path followed by the waves. Therefore it is advantageous to provide a second pair of transducers (not shown) in a horizontal plane mounted in the housings 34 and 36 (see FIG. 3). It is not necessary to describe any further the operation of the second pair of transducers, except that they are preferably operated on a frequency different from that of the transducers 38 and 40. In order to reduce the weight of the associated electronic circuits, a suitable manual or automatic switching system may be employed.

The frequency of the signals produced by the oscillator 62 and the duration of a clock cycle may obviously be modified. The necessity of producing a narrow ultrasonic beam with transducers of an acceptable size leads to frequencies above 100 kilocycles per second. On the other hand, the necessity of separating, by a thickness of at least a few centimeters of an absorbent material, the transmitting and receiving transducers sets an upper limit to the transmission frequency because of the prohibitive attenuation of very high frequency acoustic waves, even in the absence of any fracture. In practice the upper frequency limit is about 700 kilocycles per second. As to the duration of the pulse transmitted by the transducer 38, about 10 periods of the high frequency signal are generally sufficient.

The clock frequency is determined by the speed at which it is desired to raise or lower the sounding rod during measurement and by the spacing of the transmitting and receiving transducers located in the vertical plane. It is sufficient for the period of a clock cycle to be short relative to the time of travel of the sounding rod over a distance equal to that separating the transmitting and receiving transducers.

While the fundamental novel features of the invention have been shown and described, it will be understood that various substitutions, changes and modifications in the form and details of the apparatus illustrated and its manner of operation may be made by those skilled in the art without departing from the spirit of the invention. All such variations and modifications, therefore, are included within the intended scope of the invention as defined by the following claims.

I claim:

1. Apparatus for examining a formation through which a borehole extends, comprising
    means for transmitting a beam of ultrasonic acoustic energy from the borehole into the formation, substantially all of the acoustic energy in the formation being propagated as shear waves,
    receiving means in spaced relation to the transmitting means for generating an electrical signal in response to the acoustic energy received in the borehole from the formation, and
    means responsive to the electrical signal for determining the attenuation suffered by the acoustic energy between the transmitting means and the receiving means, the attenuation determining means including,
        means coupled to the receiving means for amplifying the electrical signal generated thereby, the gain of the amplifying means being variable by a control voltage applied thereto,
        means coupled to the amplifying means for detecting the amplified signal,
        means coupled to the detecting means for filtering the detected signal to produce an average amplitude signal,
        means for generating a reference amplitude signal,
        amplitude comparator means responsive to the average amplitude signal and to the reference amplitude signal for generating an error signal, the error signal being proportional to the difference in amplitude between the average amplitude signal and the reference amplitude signal, and
        means for storing the error signal to produce the gain control voltage for the amplifying means, the storing means being coupled to the amplifying means and the gain control voltage being representative of the attenuation suffered by the acoustic energy between the transmitting means and the receiving means.

2. Apparatus according to claim 1, wherein there is a logarithmic relationship between the gain of the amplifying means and the control voltage applied thereto.

3. Apparatus according to claim 1, including means coupled to the storing means for measuring the gain control voltage.

4. Apparatus according to claim 1, including means responsive to the detecting means for generating a reading signal to control the operation of the amplitude comparator means.

5. Apparatus according to claim 4, wherein the reading signal enables operation of the amplitude comparator means only within the period during which acoustic energy is received by the receiving means from the formation.

6. Apparatus according to claim 4, including threshold means for preventing a reading signal from being generated in response to extraneous signals generated by the receiving means.

7. Apparatus for examining a formation through which a borehole extends, comprising
    means for transmitting a beam of pulses of ultrasonic acoustic energy from the borehole into the formation to propagate substantially all of the acoustic energy in the formation as shear waves,
    the transmitting means including transducer means mounted in a housing of acoustic energy absorbing material, the housing being so formed that acoustic energy is transmitted from the transducer means in a beam into the formation so disposed with respect to the borehole wall that compression waves are substantially totally reflected from the borehole wall and are substantially totally absorbed by the acoustic energy absorbing material,
    receiving means in spaced relation to the transmitting means for generating an electrical signal in response to the acoustic energy received in the borehole from substantially only the shear wave acoustic energy in the formation, and
    means responsive to the transmitting means and to the electrical signal for determining the transmission time of the shear wave acoustic energy between the transmitting means and the receiving means.

8. Apparatus for examining a formation through which a borehole extends, comprising
    means for transmitting a beam of pulses of ultrasonic acoustic energy from the borehole into the formation,
    receiving means in spaced relation to the transmitting means for generating an electrical signal in response to the acoustic energy received in the borehole from the formation, and
    means responsive to the transmitting means and to the electrical signal for determining the transmission time of the acoustic energy between the transmitting means and the receiving means, the transmitting means including clock pulse generating means and means adapted to be triggered by the clock pulse generating means to generate pulses of ultrasonic frequency energy, and
    the transmission time determining means including means responsive to the clock pulse generating means for generating a pulse the duration of which is proportional to a duration controlling voltage applied thereto and feedback control means responsive to the time of occurrence of the rear edge of the pulse of controllable duration and to the time of occurrence of the electrical signal for adjusting the duration controlling voltage so that the rear edge of the controllable duration pulse occurs in predetermined time relationship with the electrical signal, whereby the duration controlling voltage is representative of the transmission time of the acoustic energy between the transmitting means and receiving means.

9. Apparatus according to claim 8, wherein the feedback control means includes first and second means responsive to the times of occurrence of the rear edge of the controllable duration pulse and of the electrical signal for generating respectively a first signal indicating that the rear edge of the controllable duration pulse occurs prior to the predetermined time and a second signal indicating that the rear edge of the controllable duration pulse occurs later than the predetermined time, and means responsive to the first and second signals for adjusting the duration controlling voltage so that the rear edge of the controllable duration pulse occurs at the predetermined time.

10. Apparatus according to claim 9, wherein the first and second signal generating means include coincidence circuit means, and including threshold means for preventing the first and second signals from being generated in response to extraneous signals generated by the receiving means.

11. Apparatus according to claim 9, wherein the last named adjusting means includes means for storing the duration controlling voltage and means coupled to the storing means and responsive to the first and second signals for increasing and decreasing the duration controlling voltage, the storing means being coupled to the controllable pulse generator.

12. Apparatus according to claim 11, wherein the storing means includes capacitor means and the voltage increasing and decreasing means includes means for charging and discharging the capacitor means.

13. Apparatus according to claim 11, including means coupled to the storing means for measuring the duration controlling voltage.

14. Apparatus according to claim 12, including means responsive to the electrical signal for generating a pulse, and wherein the first and second signals occur during the last named pulse, the total duration of the first and second signals equals the duration of the last named pulse and the predetermined time is the midpoint in time of the last named pulse.

15. Apparatus for examining a formation through which a borehole extends, comprising
a housing of acoustic energy absorbing material adapted to be lowered into the borehole,
means for urging the housing against the wall of the borehole,
first and second means mounted in the housing for transmitting beams of ultrasonic acoustic energy from the borehole into the formation, the housing being so formed that the beams are disposed with respect to the borehole wall such that a maximum amount of shear waves and a minimum amount of compression waves are propagated into the formation, and
first and second receiving means mounted in the housing for generating electrical signals in response to the acoustic energy received in the borehole from substantially only the shear wave acoustic energy in the formation in response to the first and second transmitting means respectively, the first transmitting and receiving means being aligned in a first plane and the second transmitting and receiving means being aligned in a second plane, the first and second planes being generally mutually perpendicular.

16. Apparatus for examining a formation through which a borehole extends, comprising
a housing of acoustic energy absorbing material adapted to be lowered into the borehole,
means for urging the housing against the wall of the borehole,
first and second means mounted in the housing for transmitting beams of ultrasonic acoustic energy from the borehole into the formation, the housing being so formed that the beams are disposed with respect to the borehole wall such that a maximum amount of shear waves and a minimum amount of compression waves are propagated in the formation,
first and second receiving means mounted in the housing for generating electrical signals in response to the acoustic energy received in the borehole from the formation in response to the first and second transmitting means respectively, the first transmitting and receiving means being aligned generally perpendicularly of the second transmitting and receiving means, and
means for switching operation between the first transmitting and receiving means and the second transmitting and receiving means.

17. A method of examining a formation through which a borehole extends, comprising the steps of
transmitting from a first electroacoustical transducer a beam of ultrasonic acoustic energy from the borehole into the formation so that substantially all of the acoustic energy in the formation is propagated as shear waves and so that compression waves are substantially totally reflected from the borehole wall,
absorbing the acoustic energy transmitted outside of the beam and the compression waves reflected from the borehole wall,
generating by a second electroacoustical transducer in spaced relation to the first electroacoustical transducer an electrical signal in response to the acoustic energy received in the borehole from substantially only the shear wave acoustic energy in the formation,
comparing the amplitude of the electrical signal with the amplitude of a reference signal to determine the attenuation suffered by the shear wave acoustic energy, and
measuring the transmission time of the shear wave acoustic energy between the first and second transducers.

18. Apparatus for examining a formation through which a borehole extends, comprising
means for transmitting a beam of ultrasonic acoustic energy from the borehole into the formation to propagate substantially all of the acoustic energy in the formation as shear waves,
the transmitting means including transducer means mounted in a housing of acoustic energy absorbing material, the housing being so formed that acoustic energy is transmitted from the transducer means in a beam into the formation so disposed with respect to the borehole wall that compression waves are substantially totally reflected from the borehole wall and are substantially totally absorbed by the acoustic energy absorbing material,
receiving means in spaced relation to the transmitting means for generating an electrical signal in response to the acoustic energy received in the borehole from substantially only the shear wave acoustic energy in the formation,
and means responsive to the electrical signal for determining the attenuation suffered by the shear wave acoustic energy between the transmitting means and the receiving means.

19. Apparatus according to claim 18, including means responsive to the electrical signal for determining the transmission time of the acoustic energy between the transmitting means and the receiving means.

20. Apparatus for examining a formation through which a borehole extends, comprising
means for transmitting a beam of ultrasonic acoustic energy from the borehole into the formation to propagate substantially all of the acoustic energy in the formation as shear waves,
receiving means in spaced relation to the transmitting means for generating an electrical signal in response to the acoustic energy received in the borehole from substantially only the shear wave acoustic energy in the formation,
means coupled to the receiving means for amplifying the electrical signal generated thereby, the gain of the amplifying means being variable by a control voltage applied thereto,
means for generating a reference amplitude signal,
means for comparing the amplified electrical signal and the reference amplitude signal to generate an error signal, the error signal being proportional to the difference in amplitude between the amplified electrical signal and the reference amplitude signal, and means for generating the gain control voltage in response to the error signal, the gain control voltage generating means being coupled to the variable gain amplifying means and the gain control voltage being representative of the attenuation suffered by the shear wave acoustic energy between the transmitting means and the receiving means.

References Cited

UNITED STATES PATENTS

| | | | |
|---|---|---|---|
| 2,156,052 | 4/1939 | Cooper | 181—.5 |
| 2,825,044 | 2/1958 | Peterson | 181—.5 |
| 2,943,694 | 7/1960 | Goodman | 181—.5 |
| 3,252,131 | 5/1966 | Vogel | 340—18 |
| 2,880,816 | 4/1959 | Widess et al. | 181—.5 |
| 3,276,533 | 10/1966 | Pickett et al. | 181—.5 |
| 3,302,164 | 1/1967 | Waters et al. | 181—.5 X |
| 3,102,251 | 8/1963 | Blizard | 340—18 |

OTHER REFERENCES

Pickett: Acoustic Character Logs . . . in Formation Evaluation, Journal of Petroleum Technology, June 1963, pp. 659–667.

BENJAMIN A. BORCHELT, *Primary Examiner.*

W. KUJAWA, *Assistant Examiner.*

Notice of Adverse Decision in Interference

In Interference No. 96,981, involving Patent No. 3,406,776, L. Henry, ACOUSTIC METHOD AND APPARATUS FOR EXAMINING FORMATIONS ADJACENT THE WALLS OF BOREHOLES, final judgment adverse to the patentee was rendered Jan. 9, 1975, as to claims 7 and 17–19.

[*Official Gazette May 6, 1975.*]